United States Patent
Lu et al.

(10) Patent No.: US 6,980,500 B2
(45) Date of Patent: Dec. 27, 2005

(54) ATIP BIT DATA GENERATOR AND METHOD FOR GENERATING ATIP BIT DATA IN OPTICAL DISCS

(75) Inventors: Ping-Hsing Lu, Hsinchu (TW); Yao-Jen Liang, Chang Hua (TW); Chao-Long Tsai, Hsin Chu (TW)

(73) Assignee: Media Tek Inc., Hsin Chu (TW)

( * ) Notice: Subject to any disclaimer, the term of this patent is extended or adjusted under 35 U.S.C. 154(b) by 579 days.

(21) Appl. No.: 10/302,937

(22) Filed: Nov. 25, 2002

(65) Prior Publication Data

US 2003/0103428 A1    Jun. 5, 2003

(30) Foreign Application Priority Data

Nov. 26, 2001  (TW) ................. 090129343

(51) Int. Cl.[7] .............................................. G11B 7/00
(52) U.S. Cl. ................. 369/59.17; 369/59.27; 369/59.12
(58) Field of Search ........................ 369/59.17

(56) References Cited

U.S. PATENT DOCUMENTS 4,942,565 A * 7/1990 Lagadec ................. 369/47.49
5,506,824 A    4/1996 Fairchild et al.
6,125,089 A * 9/2000 Shigemori ............... 369/47.22

\* cited by examiner

Primary Examiner—Gautam R. Patel
(74) Attorney, Agent, or Firm—Birch, Stewart, Kolasch & Birch, LLP

(57) ABSTRACT

An ATIP (absolute time in pre-groove) bit data generator free from an uneven duty cycle. The ATIP bit data generator includes an analog processor, a high-frequency clock generator, a first decoder, a sync pattern detector, and a second decoder. The analog processor receives a signal generated from an optical pickup, and further processes the signal to generate an ATIP FM signal. The high-frequency clock generator provides a high-frequency clock using the ATIP FM signal as a reference signal. The first decoder receives the ATIP FM signal and the high-frequency clock and generates bi-phase data. The sync pattern detector receives the bi-phase data and the high-frequency clock, and generates a sync indication signal. The second decoder counts the pulse number of the high-frequency clock for each counting cycle, and the counting cycle includes a plurality of half periods of the ATIP FM signal. When the pulse number is smaller than a lower threshold value or greater than a upper threshold value, the second decoder outputs ATIP bit data with a first level. When the pulse number is between the lower threshold value and the upper threshold value, the second decoder outputs ATIP bit data with a second level.

16 Claims, 16 Drawing Sheets

ATIP FM signal

Bi-phase data bi-phase clock

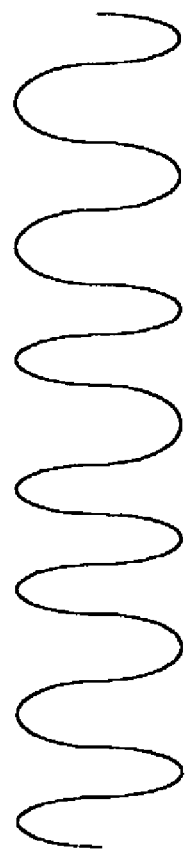
FIG. 6a  ATIP FM signal
FIG. 6b  half-period counting value
FIG. 6c  half-period indication signal
FIG. 6d  average half-period counting value FM demodulated data window edge indication signal 332  345 accumulated counting value

48 * 7 = 336  48 * 7 = 336 average cycle counting value

H   L bi-phase data

 FIG. 8a — half-period indication signal
 FIG. 8b — FM demodulated data
 FIG. 8c — FM dem. data edge signal
 FIG. 8d — window edge indication signal FIG. 8e — shift left signal FIG. 8f — shift right signal FIG. 8g — enlarge signal FIG. 8h — lessen signal half-period indication signal FM demudulated data edge signal window edge indication signal shift left signal shift right signal enlarge signal lessen signal half-period indicating signal Bi-phase data window edge indication signal ATIP sync indication signal two-window indication signal

ATIP BIT DATA GENERATOR AND METHOD FOR GENERATING ATIP BIT DATA IN OPTICAL DISCS

BACKGROUND OF THE INVENTION

1. Field of the invention

The invention relates to an absolute time in pre-groove (hereinafter referred to as ATIP) bit data generator.

2. Description of the Related Art

FIG. 1 shows an ATIP information block of 42 bits. As shown in the drawing, the 42 bit ATIP information block includes a sync pattern of 4 bits, a minute information of 8 bits, a second information of 8 bits, a frame information of 8 bits, and a CRC (cyclic redundancy check) information of 14 bits. The ATIP information provides a correct writing position in a recordable optical disc system.

FIG. 2 shows an block diagram of a conventional ATIP bit data generator, which is disclosed in U.S. Pat. No. 5,506,824, entitled "Frequency modulation to bi-phase data conversion for writable CD ATIP data." As shown in FIG. 2, the conventional ATIP bit data generator 12 utilizes a bi-phase converter 32 to convert the ATIP frequency modulation (FM) signal into the bi-phase data. Then, a digital PLL (Phase Locked Loop) 38 is used to generate a 2X-frequency clock. Finally, an ATIP decoder 26 is used to generate ATIP bit data according to the bi-phase data using the 2X frequency clock as a reference clock. The bi-phase converter 32 counts the pulse number of a high-frequency clock (generated from the high-frequency PLL 28) in each half period of the ATIP FM signal, and determines the states of the bi-phase data according to the pulse number. That is, when the pulse number is smaller than a threshold value, the bi-phase data is H; and when the pulse number is greater than the threshold value, the bi-phase data is L. The ATIP decoder 26 decodes the ATIP information according to the bi-phase data.

Under normal conditions, the above-mentioned method may generate correct bi-phase data. If the duty cycle of the ATIP FM signal is not uniform, however, the bi-phase converter 32 is influenced and can not generate correct bi-phase data because the pulse number of the high-frequency clock corresponding to each half period is shifted. Furthermore, when the reading speed for the optical disc increases, the output frequency of the high-frequency PLL 28 also correspondingly increases, thereby causing a difficult design, high cost and low resolution.

FIGS. 3a, 3b and 3c show the relationship between the ATIP FM signal and the bi-phase data, wherein FIG. 3a represents the ATIP FM signal, FIG. 3b represents the bi-phase data, and FIG. 3c represents the bi-phase clock signal. When the ATIP FM signal is at high frequency, the bi-phase data is H; and when the ATIP FM signal is at low frequency, the bi-phase data is L.

SUMMARY OF THE INVENTION

In view of the above-mentioned problems, an object of the invention is to provide an ATIP bit data generator, which is not influenced by the duty cycle of the ATIP FM signal.

To achieve the above-mentioned object, an ATIP bit data generator of the invention includes an analog processor, a high-frequency phase-locked loop (PLL) circuit, a first decoder, a sync pattern detector, and a second decoder. The analog processor receives a signal generated from an optical pickup and further processes the signal to generate an ATIP FM signal. The high-frequency PLL circuit generates a high-frequency clock according to the ATIP FM signal or fixed frequency oscillator. The first decoder receives the ATIP FM signal and the high-frequency clock and generates bi-phase data. The sync pattern detector receives the bi-phase data and the high-frequency clock, and enables a sync indication signal. The second decoder counts the pulse number of the high-frequency clock for each counting cycle and outputs the ATIP bit data according to the pulse number when the sync indication signal is enabled. The counting cycle includes a plurality of half periods of the ATIP FM signal. When the pulse number is smaller than a lower threshold value or greater than a upper threshold value, the second decoder outputs the ATIP bit data with a first level. When the pulse number is between the lower threshold value and the upper threshold value, the second decoder outputs the ATIP bit data with a second level.

Since the ATIP bit data generator of the invention uses a plurality of half periods of the ATIP FM signal as the counting cycle, the count value is free from being influenced by the uneven duty cycle so that the correct ATIP bit data can be generated. Meanwhile, since the counting cycle is long, the necessary frequency of the high-frequency clock may be lowered.

In addition, the ATIP bit data generator of the invention integrates the bi-phase demodulator with the ATIP data decoder, so the circuit design can be simplified and the data delay time can be reduced.

BRIEF DESCRIPTION OF THE DRAWINGS

FIGS. 3a, 3b and 3c show the relationship between the ATIP FM signal and the bi-phase data, wherein FIG. 3a represents the ATIP FM signal, FIG. 3b represents the bi-phase data, and FIG. 3c represents the bi-phase clock signal.

FIGS. 6a~6i show the timing diagrams of the first decoder.

FIGS. 8a~8h show the timing diagrams of normal condition in the FM demodulated window judge unit.

FIGS. 12a~12k show the decoding timing diagrams of the invention.

DETAILED DESCRIPTION OF THE INVENTION

The ATIP bit data generator of the invention will be described with reference to the accompanying drawings.

In an optical disc system, each ATIP bit corresponds to 2 bits of bi-phase data, and each bit of bi-phase data corresponds to 7 half periods of ATIP FM signal, approximately. Therefore, each ATIP bit corresponds to 14 half periods of ATIP FM signal. When the duty cycle of the ATIP FM signal is not symmetrical, an error in the counting value may be encountered and further causes an error in the bi-phase data if only a single half period of the ATIP FM signal is counted. To solve the problem, the present invention uses 7 half periods of the ATIP FM signal or 14 half periods of the ATIP FM signal as the counting cycle for counting the pulse number of the high-frequency clock in each counting cycle. Accordingly, the duty cycle is not influenced by the asymmetry. In addition, since the counting cycle is elongated to 7 or 14 times the original cycle, the invention may relatively increase the resolution, or lower the frequency of the high-frequency clock.

Figure 1:
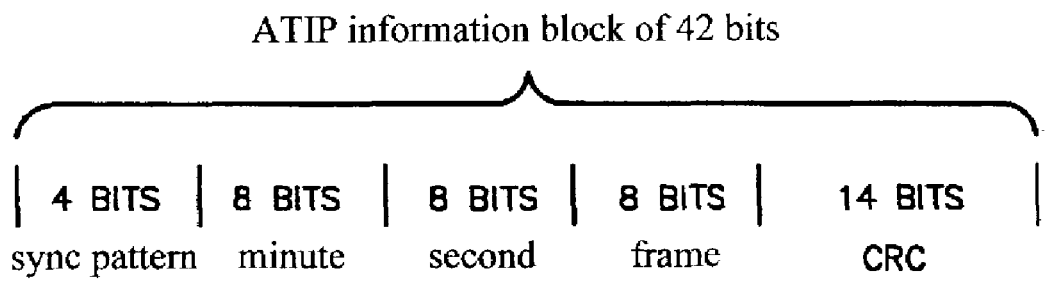
FIG. 1 shows an ATIP information block of 42 bits.
Figure 2:
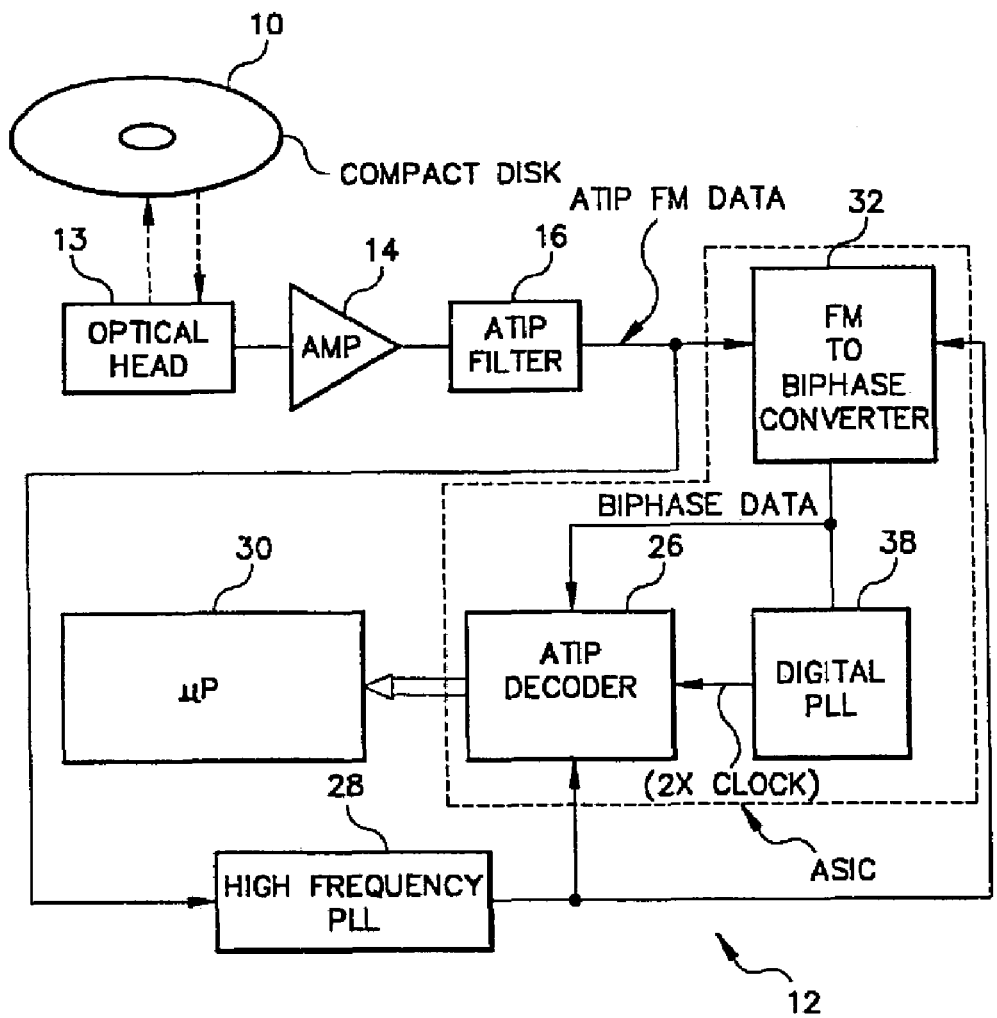
FIG. 2 is a block diagram of a conventional ATIP bit data generator.
Figure 3A:
Figure 3B:
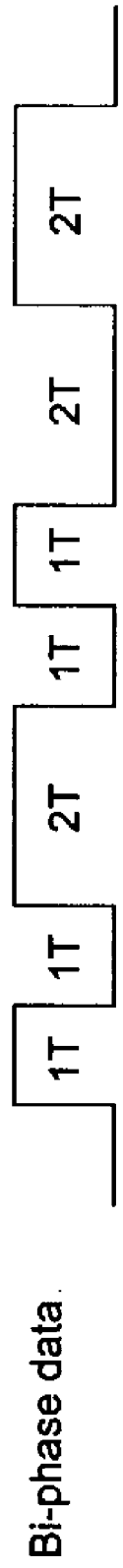
Figure 3C:
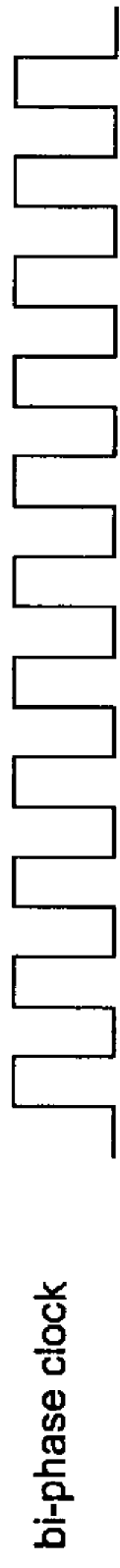
Figure 4:
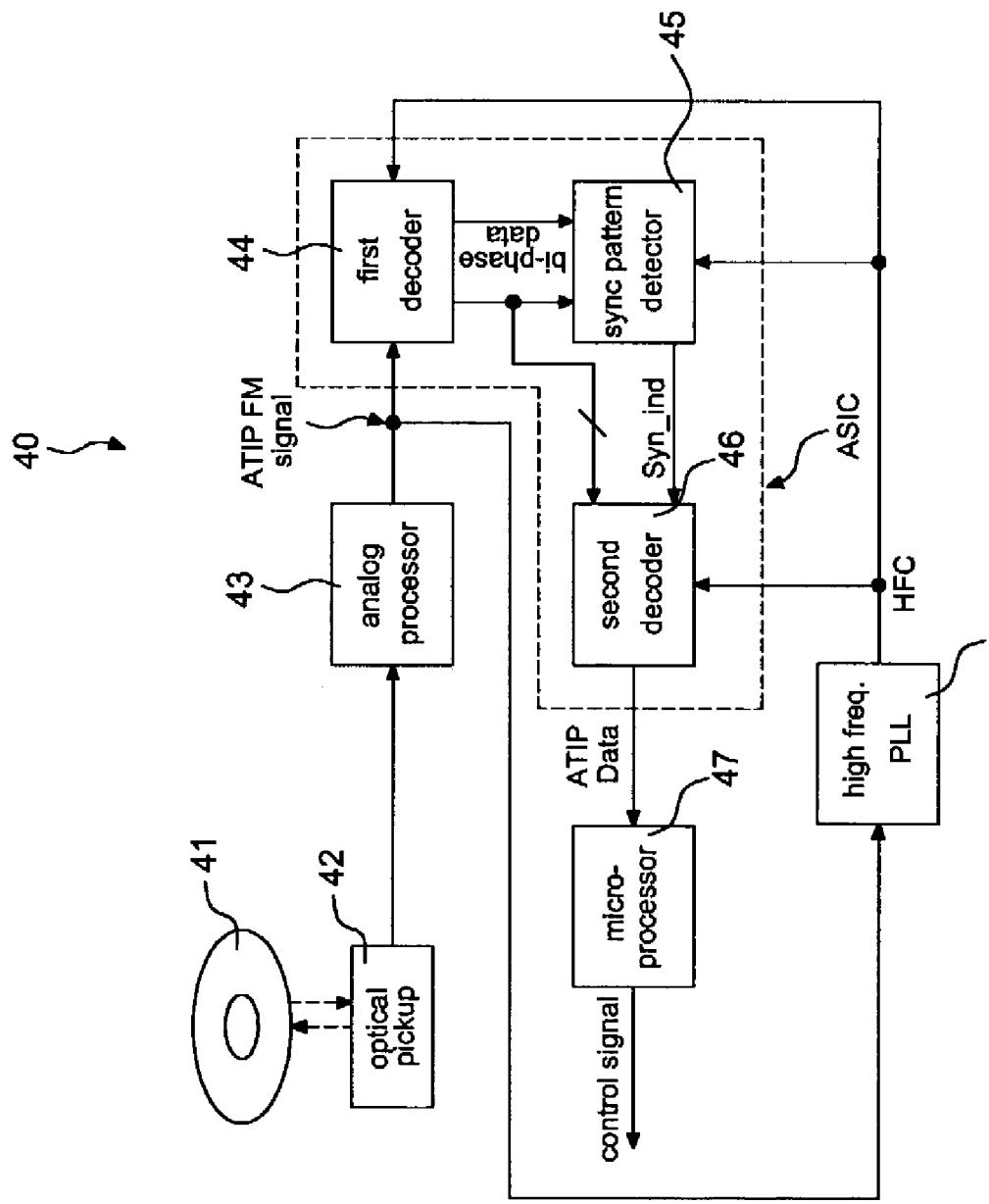
FIG. 4 is a block diagram of an ATIP bit data generator of the invention.

FIG. 4 is a block diagram of the ATIP bit data generator of the present invention. As shown in the drawing, the ATIP bit data generator 40 of the invention includes an optical pickup 42 for receiving information from the optical disc 41, an analog processor 43 for receiving signals from the optical pickup 42, a first decoder 44 for receiving the ATIP FM signal and generating the bi-phase data, a half-period counting value, a half-period indication signal, an average half-period counting value and window edge indication signal WE_ind, a sync pattern detector 45 for receiving the bi-phase data and the window edge indication signal WE_ind and generating a sync indication signal Syn_ind, a second decoder 46 for receiving the sync indication signal Syn_ind, window edge indication signal WE_ind, the half-period counting value, the half-period indication signal and the average half-period counting value and generating the ATIP data, a high-frequency phase-locked loop (PLL) circuit 48 for generating a high-frequency clock, and a microprocessor 47 for receiving the ATIP data and generating a control signal.

The analog processor 43 processes and amplifies the signals generated from the optical pickup 42, and further generates the ATIP FM signal. Taking the 32X CD drive as an example, the center frequency of the ATIP FM signal is 705.6 Khz (22.05 Hz*32), the high frequency of the ATIP FM signal is 737.6 Khz (23.05 KHz*32), and the low frequency of the ATIP FM signal is 673.6 Khz (21.05 KHz*32). The analog processor 43 has a typical architecture, which will not be repeated here. The high-frequency PLL 48 generates a high-frequency clock (HFC) according to the ATIP FM signal. The frequency of the HFC may be determined according to the frequency and resolution of the ATIP FM signal. Taking the 32X CD drive as an example, the embodiment chooses the fixed frequency of 67.7376 MHz as the frequency of the high-frequency clock HFC. In addition, the microprocessor 47 has conventional functions, which will not be repeated here.

Figure 5:
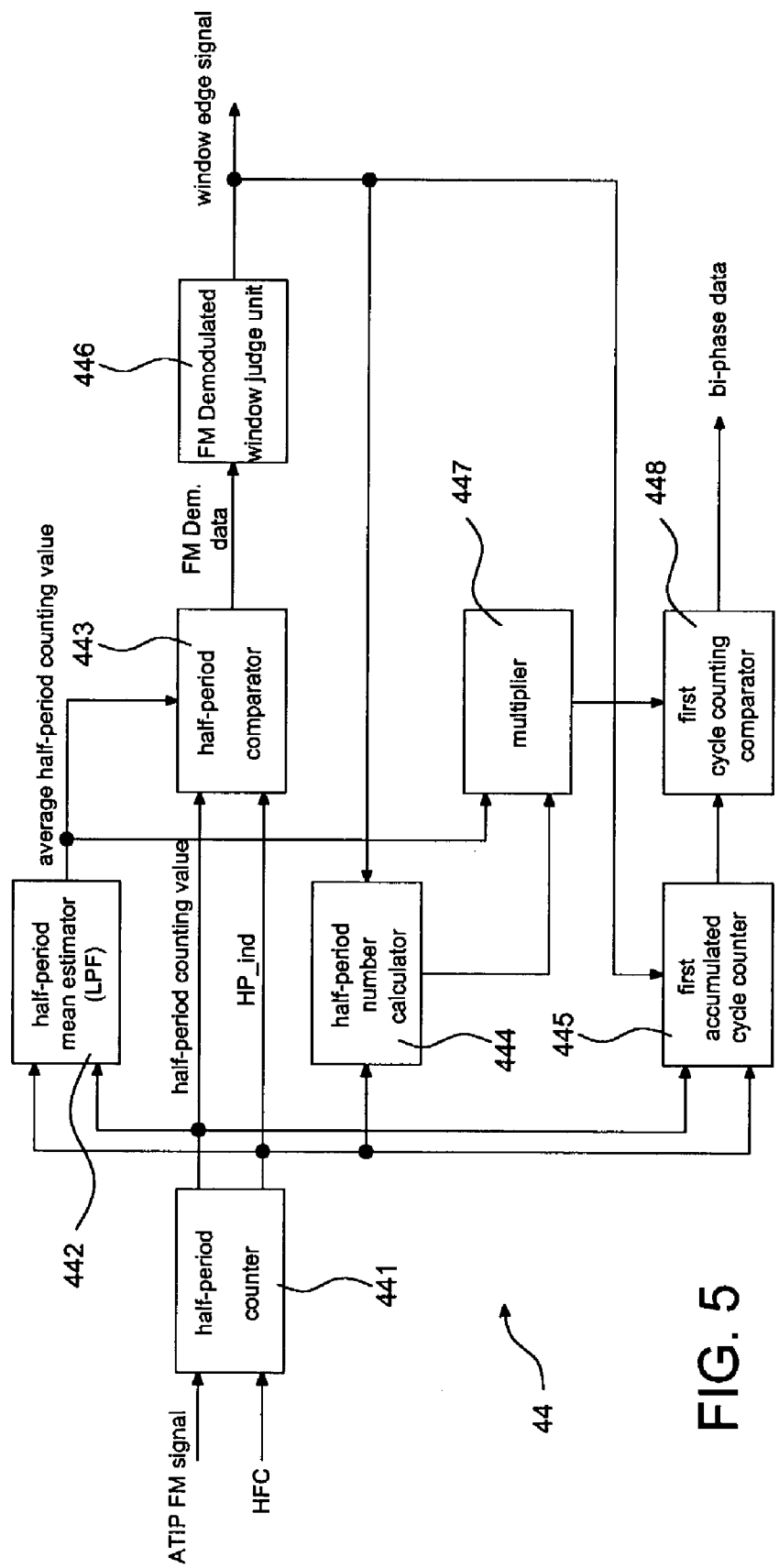
FIG. 5 is a block diagram of a first decoder of the invention.

The first decoder 44 receives the ATIP FM signal from the analog processor 43 and generates bi-phase data and also the window edge indication signal WE_ind, the half-period counting value, the half-period indication signal and the average half-period counting value using the high-frequency clock HFC as a reference clock. FIG. 5 shows a block diagram of the first decoder 44. As shown in the drawing, the first decoder 44 includes a half-period counter 441, a half-period mean estimator 442, a half-period comparator 443, a half-period number calculator 444, a first accumulated cycle counter 445, a FM demodulated window judge unit 446, a multiplier 447 and a first cycle counting comparator 448. The half-period counter 441 receives the ATIP FM signal and the high-frequency clock HFC, counts the pulse number of the high-frequency clock HFC in each half period of the ATIP FM signal and outputs a half-period counting value and a half-period indication signal HP_ind. When the half-period counting value is ready, the half-period counter 441 provides a pulse at the half-period indication HP_ind signal. The half-period mean estimator 442 receives the half-period counting value and half-period indication HP_ind signal to generate an average half-period counting value. The half-period mean estimator 442 can be a low pass filter (LPF) and updates the average half-period counting value at each pulse of the half-period indication HP_ind. The half-period comparator 443 compares the half-period counting value with the average half-period counting value and generates a FM demodulated data. When the half-period counting value is greater than the average half-period counting value, the FM demodulated data is L, otherwise the FM demodulated data is H. The FM demodulated window judge unit 446 generates a window edge indication signal WE_ind according to the FM demodulated data. The window edge indication signal WE_ind defines a counting cycle. In this embodiment, the counting cycle is 6, 7 or 8 half periods of the ATIP FM signal.

Figure 6E:
Figure 6F:
Figure 6G:
Figure 6H:
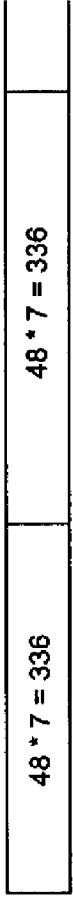
Figure 6I:

The half-period number calculator 444 calculates the half-period number according to the half-period indication signal HP_ind and the window edge indication signal WE_ind. That is, the half-period number calculator 444 counts the pulse number of the half-period indication signal HP_ind between two pulses of the window edge indication signal WE_ind as the half-period number. The multiplier 447 multiplies the average half-period counting value by the half-period number and provides an average cycle counting value for each WE_ind indicated window. The first accumulated cycle counter 445 accumulates the half-period counting value in each counting cycle defined by the window edge indication signal and generates an accumulated counting value. Finally, the first cycle counting comparator 448 compares the accumulated counting value with the average cycle counting value and generates the bi-phase data. When the accumulated counting value is greater than the average cycle counting value, the bi-phase data is L, otherwise, the bi-phase data is H. Because the average half-period counting value is updated continually, even when the center frequency of the ATIP FM signal is unstable, the average cycle counting value also is updated based on the average half-period counting value. Therefore, the first decoder 44 can generate correct bi-phase data. FIGS. 6a~6i show the timing diagram of the signals for the first decoder 44, wherein FIG. 6a is the ATIP FM signal, FIG. 6b is the half-period counting value, FIG. 6c is the half-period indication signal, FIG. 6d is the average half-period counting value, FIG. 6e is the FM demodulated data, FIG. 6f is the window edge indication, FIG. 6g is the accumulated counting, FIG. 6h is the average cycle counting value and FIG. 6i is the bi-phase data. As shown in the drawing, the average half-period counting value is 48 and the average cycle counting value is 336.

Figure 7:
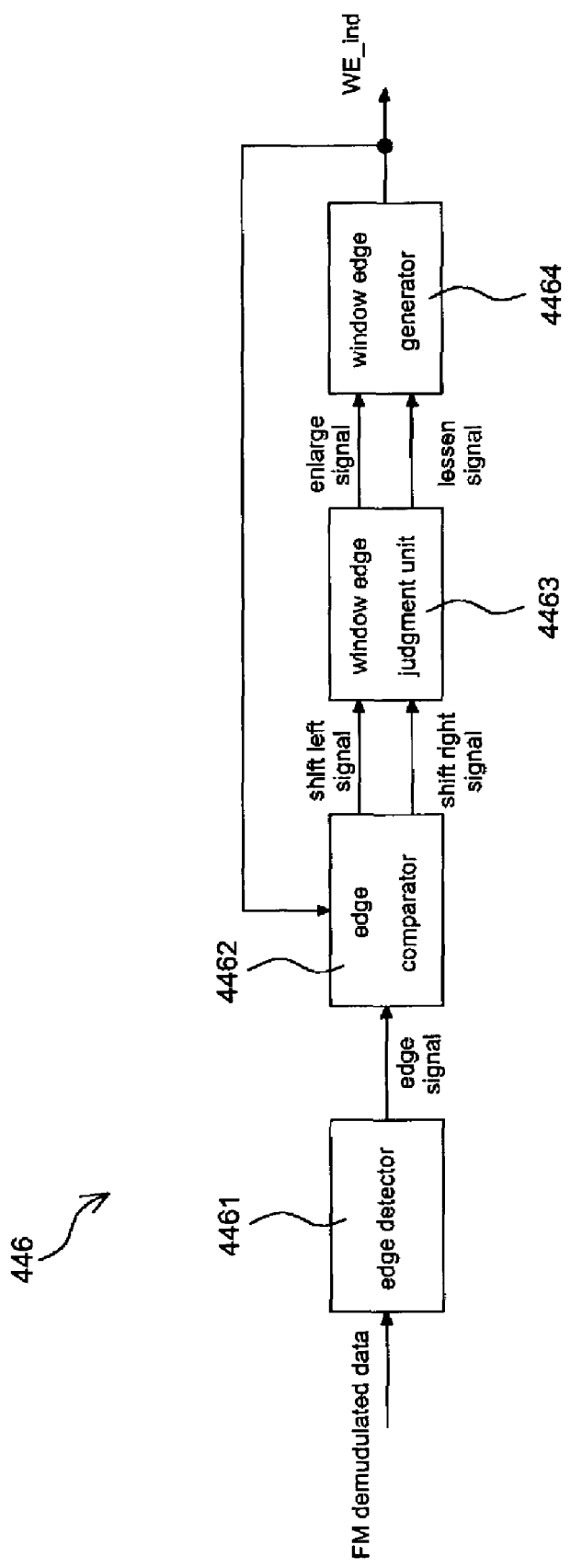
FIG. 7 is a block diagram of the FM demodulated window judge unit.
Figure 9A:
FIGS. 9a~9h shows the timing diagrams of shift right 1 half period condition in the FM demodulated window judge unit.
Figure 9B:
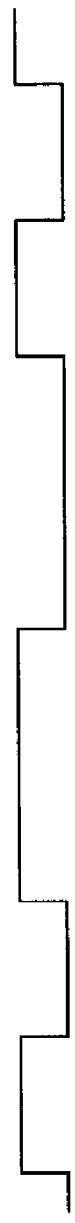
Figure 9C:
Figure 9D:
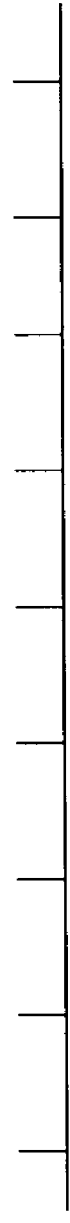
Figure 9E:
Figure 9F:
Figure 9G:
Figure 9H:

FIG. 7 shows the block diagram of the FM demodulated window judge unit. The FM demodulated window judge unit 446 includes an edge detector 4461, an edge comparator 4462, a window edge judgment unit 4463, and a window edge generator 4464. The edge detector 4461 detects the edge of the FM demodulated data, and generates a pulse on the data edge signal. The edge comparator 4462 compares the pulse of the data edge signal with the pulse of the window edge indication signal WE_ind generated from the window edge generator 4464 and generates a shift left signal and shift right signal. If the pulse of the window edge indication signal is later than the pulse of the data edge signal, the edge comparator 4462 generates a pulse on the shift right signal. If the pulse of the window edge indication signal is before than the pulse of the data edge signal, the edge comparator 4462 generates a pulse on the shift left signal. The window edge judgment unit 4463 generates an enlarge signal and a lessen signal based on the shift right signal and shift left signal. If the window edge judgment unit 4463 detects N pulses on the shift right signal continually, such as 5 pulses, the lessen signal is enabled. If the window edge judgment unit 4463 detects N pulses on the shift left signal continually, such as 5 pulses, the enlarge signal is enabled. Finally, the window edge generator 4464 generates the window edge indication signal WE_ind based on the enlarge signal and the lessen signal. When the enlarge signal and the lessen signal are all disabled, the window edge generator 4464 generates a pulse on the window edge indication signal every 7 pulses of the half-period indication HP_ind signal. When the enlarge signal is enabled, the window edge generator 4464 generates a pulse on the window edge indication signal every 8 pulses of the half-period indication HP_ind signal. And when the lessen signal is enabled, the window edge generator 4464 generates a pulse on the window edge indication signal every 6 pulses of the half-period indication HP_ind signal. FIGS. 8a~8h show the timing diagram of the signals for the FM demodulated window judge unit 446, where the enlarge signal and the lessen signal are all disabled. FIGS. 9a~9h show the timing diagram of the signals for the FM demodulated window judge unit 446, where the lessen signal is enabled. As shown in FIGS. 8a~8h, there are no pulses on the shift left signal, the shift right signal, the enlarge signal and the lessen signal. As shown in FIGS. 9a~9h, because the shift right signal includes a plurality of pulses, the lessen signal is enabled.

Because the first decoder 44 uses multiple half periods, such as 6, 7, or 8 periods, of the ATIP FM signal as the counting cycle, the count error caused by the uneven duty cycle may be canceled or reduced. In addition, if the system is under the same resolution, the frequency of the high-frequency clock HFC of the invention can be reduced to 1/7 times of the original frequency.

After detecting the bi-phase data, the sync pattern detector 45 detects whether or not a specific pattern of the sync pattern of the ATIP data, such as "000101111"or "11101000," is found in the bi-phase data. If the specific pattern in the bi-phase data is detected, the sync indication signal Syn_ind is enabled. Since the technology for detecting whether or not a specific pattern exists in a sequentially digital signal is well known to one of ordinary skill in the art, a detailed description thereof will be omitted.

When the sync indication signal Syn_ind is enabled, it represents that the next detected ATIP FM signal includes encoded ATIP data. Therefore, the second decoder 46 starts to operate when the sync indication signal Syn_ind is enabled. The second decoder 46 uses typically 14 half periods of the ATIP FM signal as the counting cycle to count the pulse number of the high-frequency clock in each counting cycle, and to generate the ATIP data according to the range of the pulse number.

Figure 10:
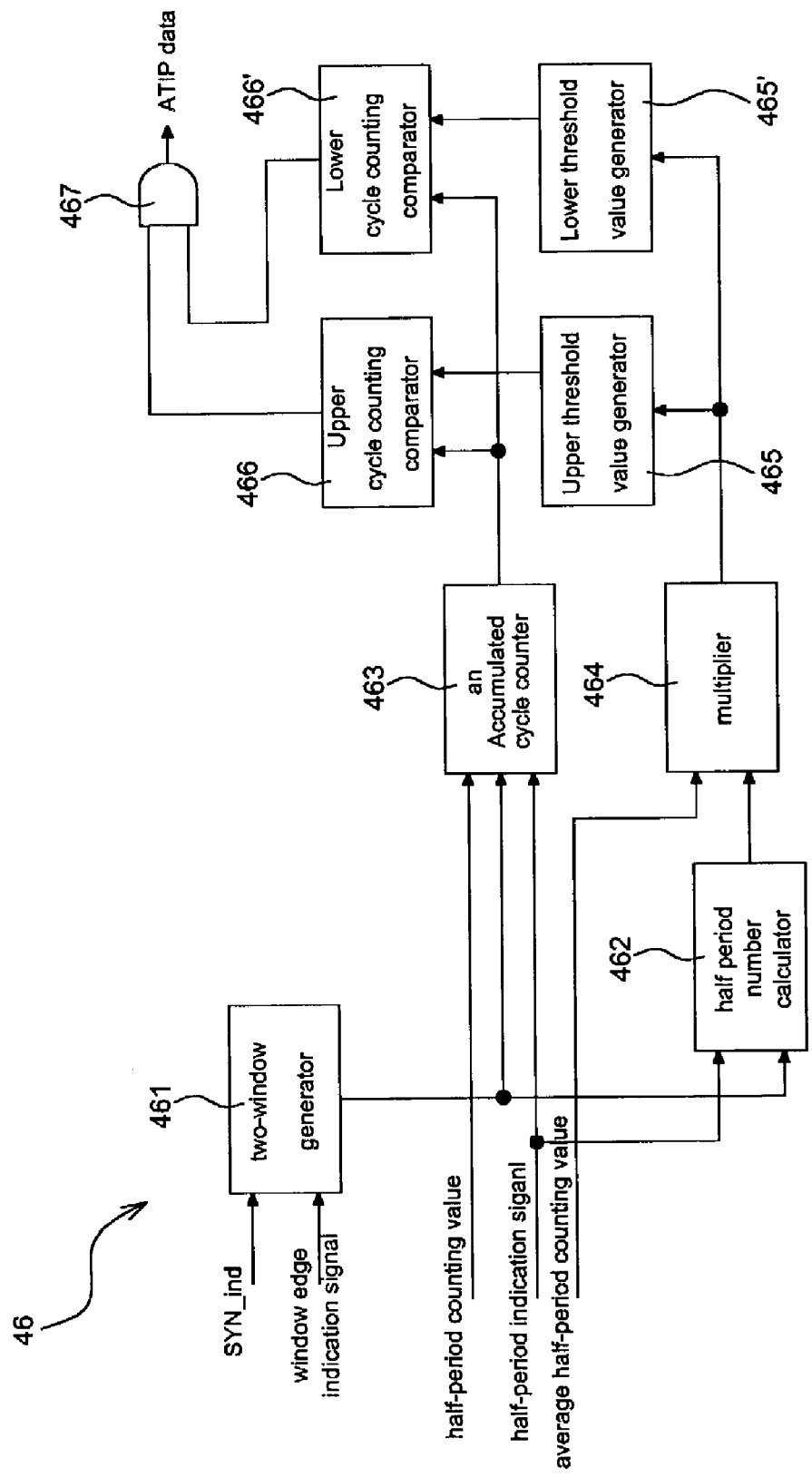
FIG. 10 is a block diagram of a second decoder of the invention.
Figure 11A:
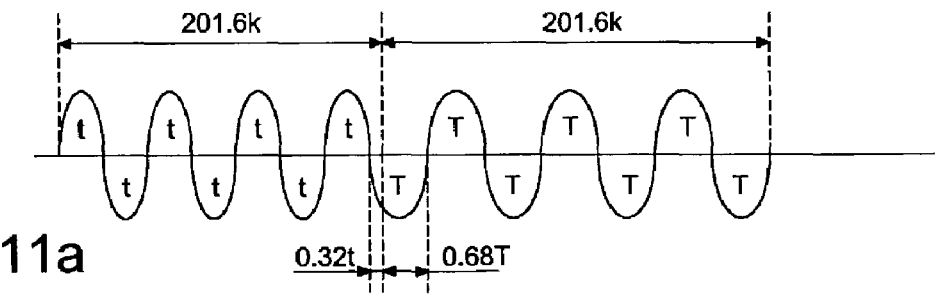
FIGS. 11a~11d show examples with counting cycles of 14 half periods of the ATIP FM signal.
Figure 11B:
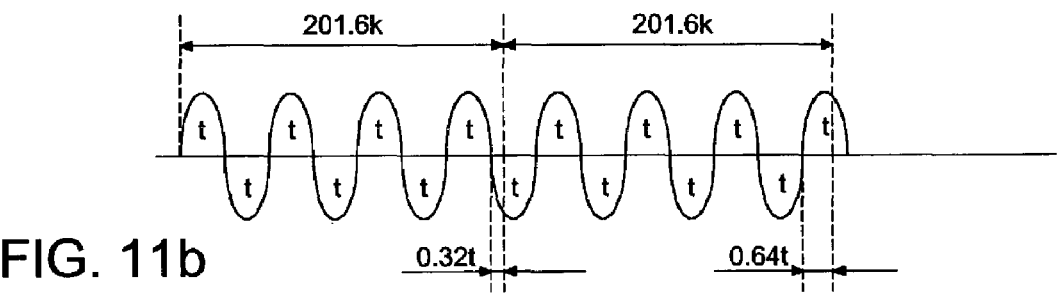
Figure 11C:
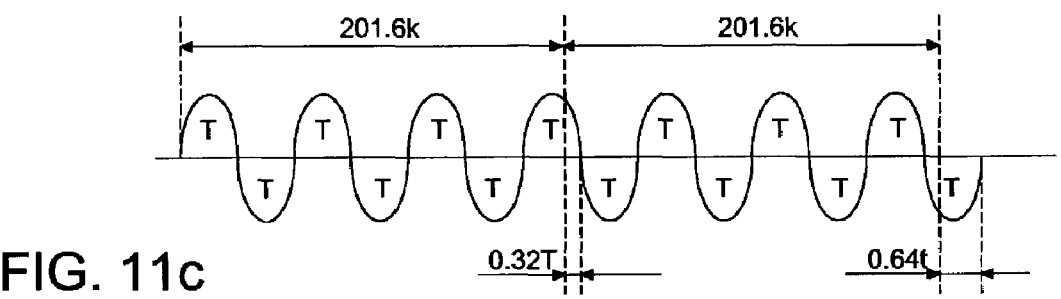
Figure 11D:
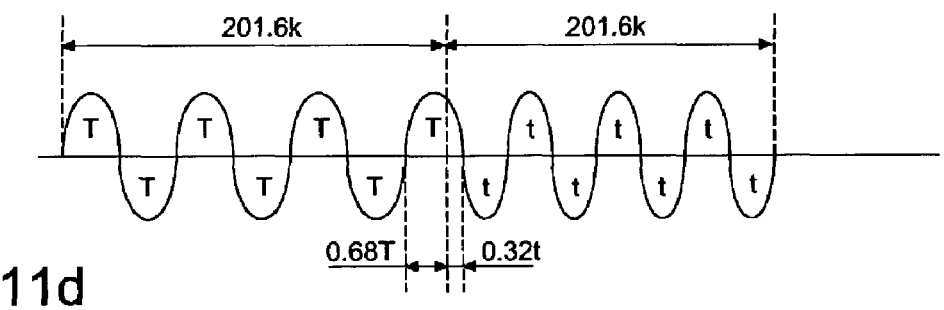

FIG. 10 shows an embodiment of the second decoder 46 of the invention. As shown in the drawing, the second decoder 46 includes a two-window generator 461, a half-period number calculator 462, a second accumulated cycle counter 463, a multiplier 464, two threshold value generators 465, 465', two cycle counting comparators 466, 466' and an AND gate 467. The two-window generator 461 receives the sync indication signal Syn_ind from the sync pattern detector 45 and the window edge indication signal WE_ind from the first decoder 44, and generates a two-window indication signal. The two-window generator 461 generates a pulse of the two-window indication signal for each two window edge indication signal WE_ind. The half-period number calculator 462 calculates a second half-period number according to the half-period indication signal HP_ind and the two-window edge indication signal. That is, the half-period number calculator 462 counts the pulse number of the half-period indication signal HP_ind between two pulses of the two-window edge indication signal as the second half-period number. The second half-period number is 13, 14 or 15. The second accumulated cycle counter 463 accumulates the half-period counting value in each counting cycle defined by the two-window edge indication signal and generates a second cycle counting value. The multiplier 464 multiplies the average half-period counting value by the second half-period number and provides an average cycle counting value V2. The threshold value generators 465, 465' generate an upper threshold value Upper_Th and a lower threshold value Lower_Th, respectively, based on the average cycle counting value V2. The upper threshold value Upper_Th and the lower threshold value Lower_Th are calculated according to Equations (2) and (3):

$$\text{Upper\_}Th = V2*N1 \quad (2)$$

$$\text{Lower\_}Th = V2*N2 \quad (3)$$

wherein N1 is about (1+2.38%), N2 is about (1−2.17%), and V2 is the average cycle counting value in every two-window edge indicated window. Taking the 32X CD drive for an example, the average cycle counting value is about 672. Consequently, the lower threshold value Lower_Th and the upper threshold value Upper_Th are 657 and 688, respectively, according to Equations (2) and (3).

The cycle counting comparators 466, 466' compare the second cycle counting value with the upper threshold value Upper_Th and lower threshold value Lower_Th, respectively, and generate upper data and lower data. If the second cycle counting value is greater than the upper threshold value Upper_Th, the upper data is L, otherwise the upper data is H. If the lower threshold value Lower_Th is greater than the second accumulated counting value, the lower data is L, otherwise the lower data is H. The AND gate 467 receives the upper data and lower data and generates the ATIP data.

The function of the cycle period comparators 466, 466' and the AND gate 467 are to generate the ATIP data. That is, when the second cycle counting value is between the upper threshold value Upper_Th and lower threshold value Lower_Th, the ATIP data is H, otherwise the ATIP data is L. FIGS. 11a~11d show examples with counting cycle of 14 half periods of the ATIP FM signals, respectively, wherein "T" represents the low-frequency cycle of the ATIP FM signal and "t" represents the high-frequency cycle of the ATIP FM signal. As shown in FIGS. 11a~11d, four examples are shown in the bi-phase data as 10, 11, 00, and 01, and they represents the ATIP data of 1, 0, 0, 1, respectively. Under the 32X drive architecture, if the frequency of the high-frequency clock HFC is 67.7376 MHz, the pulse numbers counted by the second decoder 46 of the invention for the four examples are 672(67.7376 M/(201.6K/2)), 642(67.7376 M/(23.05K*32/7)), 704(67.7376 M/(21.05K*32/7)) and 672 (67.7376 M/(201.6K/2)), respectively. Therefore, as shown in the above-mentioned data, as long as the pulse number is between the lower threshold value Lower_Th and the upper threshold value Upper_Th, the ATIP data is 1. Otherwise, the ATIP data is 0.

Figure 12A:
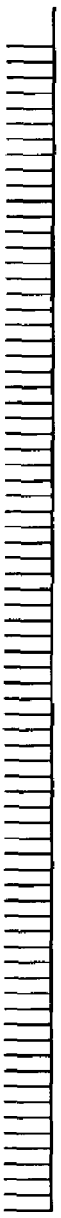
Figure 12B:
Figure 12C:
Figure 12D:
Figure 12E:

FIGS. 12a~12k show wave diagrams of some signals for the second decoder 46. FIG. 12a is the half-period indication signal. FIG. 12b is the bi-phase data. FIG. 12c is the window edge indication signal. FIG. 12d is the ATIP sync indication signal. FIG. 12e is the two-window indication signal. FIG. 12f is the second cycle counting value. FIG. 12g is the average half-period counting value. FIG. 12h is the average cycle counting value. FIG. 12i is the upper threshold value Upper_Th. FIG. 12j is the lower threshold value Lower_Th. FIG. 12k is the ATIP data. The ATIP data is usable after the ATIP sync indication signal is enabled. It should be noted that the 32X CD drive is used in FIG. 12, and the frequency of the high-frequency clock is set to be 67.7376 MHz. Therefore, as shown in FIG. 12, using the prior art may cause errors in bi-phase data, while using the device and method of the invention is error-free. In addition, it is noted that, the resolution of the invention is higher than that of the prior art while using the same frequency of the high-frequency clock.

Figure 13:
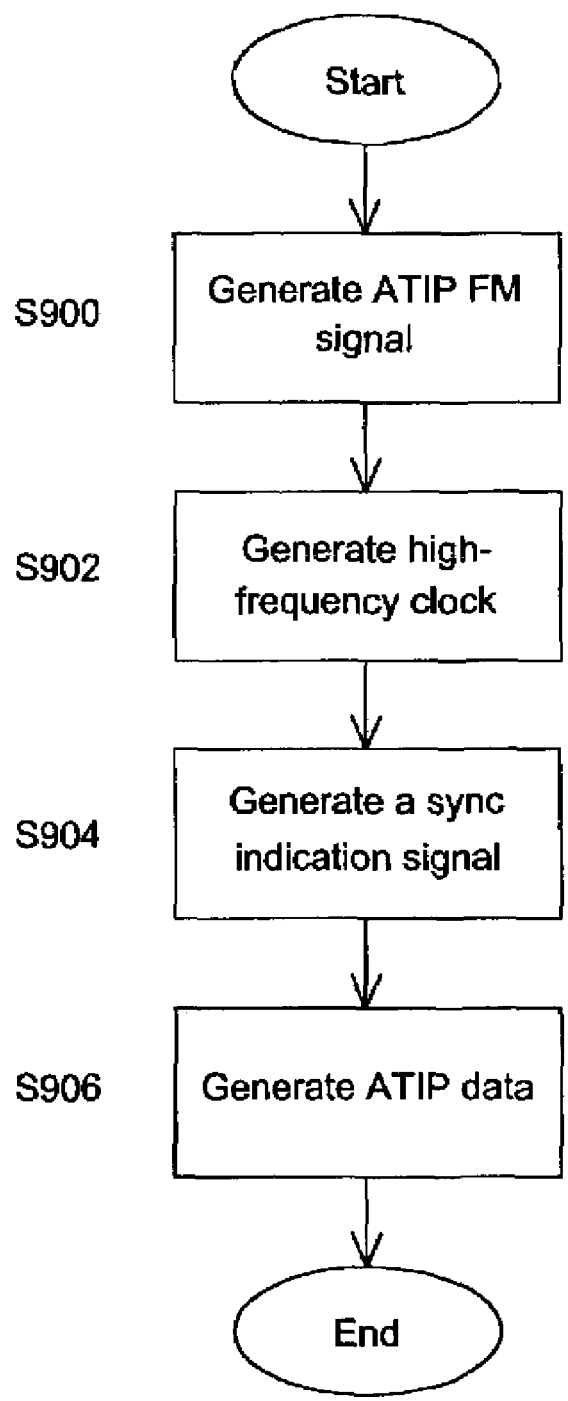
FIG. 13 is a flow chart of the bit data generator of the invention.

The method for generating ATIP bit data of the invention will be described with reference to FIG. 13. The method includes the steps described in the following.

Step S900: generate an ATIP FM signal by receiving a signal generated from an optical pickup and further processing the signal.

Step S902: generate a high-frequency clock using the ATIP FM signal as a reference signal. The high-frequency clock may be generated from the high-frequency phase-locked loop (PLL) circuit.

Step S904: generate a sync indication signal according to the ATIP FM signal and the high-frequency clock. When the ATIP signal is detected, the sync indication signal is enabled.

Step S906: generate the ATIP bit data when the sync indication signal is enabled. That is, the pulse number of the high-frequency clock for each counting cycle, such as 14 half periods of the ATIP FM signal, are counted. When the pulse number is smaller than a lower threshold value or greater than a upper threshold value, the ATIP bit data with a first level is outputted. On the other hand, when the pulse number is between the lower threshold value and the upper threshold value, the ATIP bit data with a second level is outputted. The reference values of the upper threshold value and the lower threshold value are shown as described in Equations (2) and (3).

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art.

What is claimed is:

1. An ATIP bit data generator, comprising:
   an analog processor for receiving a signal generated from an optical pickup, and further processing the signal to generate an ATIP FM signal;
   a high-frequency clock generator for generating a high-frequency clock;
   a first decoder for receiving the ATIP FM signal and the high-frequency clock, and generating a bi-phase data;
   a sync pattern detector for receiving the bi-phase data and the high-frequency clock, and generating a sync indication signal; and
   a second decoder for counting a pulse number of the high-frequency clock for each first counting cycle, the first counting cycle including a plurality of half periods of the ATIP FM signal, wherein:
   when the pulse number is smaller than a lower threshold value or greater than a upper threshold value, the second decoder outputs ATIP bit data with a first level; and
   when the pulse number is between the lower threshold value and the upper threshold value, the second decoder outputs ATIP bit data with a second level.

2. The ATIP bit data generator according to claim 1, wherein the first decoder comprises:
   a half-period counter for receiving the ATIP FM signal and the high-frequency clock, counting the pulse number of the high-frequency clock for each half period of the ATIP FM signal, and generating a half-period counting value and a half-period indication signal;
   a half-period mean estimator for receiving the half-period counting value and the half-period indication signal to generate an average half-period counting value;
   a half-period comparator for comparing the half-period counting value and the average half-period counting value and generating a FM demodulated data;
   a window judge unit for receiving the FM demodulated data and generating a window edge indication signal;
   a first half-period number calculator for calculating a pulse number for each cycle of the window edge indication signal as a first period number of a second counting cycle;
   a first multiplier for multiplying the average half-period counting value by the first period number and generating a first average cycle counting value;
   a first accumulated cycle counter for accumulating the half-period counting value in each cycle of the window edge indication signal as a first accumulated counting value; and
   a first cycle counting comparator for comparing the first accumulated counting value with the first average cycle counting value and generating the bi-phase data;
   wherein when the first accumulated counting value is greater than the first average cycle counting value the bi-phase data is L, otherwise the bi-phase data is H.

3. The ATIP bit data generator according to claim 2, wherein the second counting cycle is 6, 7 or 8 half periods of ATIP FM signal.

4. The ATIP bit data generator according to claim 2, wherein the second decoder comprises:
   a two-window generator for generating a two-window edge indication signal, the two-window generator generating a pulse of the two-window edge indication signal for each two pulses of the window edge indication signal;
   a second accumulated cycle counter for accumulating the half-period counting value in each cycle of the two-window edge indication signal as a second accumulated counting value;
   a second half-period number calculator for calculating a pulse number for each cycle of the two-window edge indication signal as the half-period number of the first counting cycle;
   a second multiplier for multiplying the average half-period counting value by the second period number and generating a second average cycle counting value;
   an upper threshold value generator for generating an upper threshold value based on the second average cycle counting value;

a lower threshold value generator for generating a lower threshold value based on the second average cycle counting value; and an output unit for comparing the second accumulated counting value with the upper threshold value and the lower threshold value and outputting the ATIP data.

5. The ATIP bit data generator according to claim 4, wherein the first counting cycle is 13, 14 or 15 half periods of ATIP FM signal.

6. The ATIP bit data generator according to claim 5, wherein the first level of the ATIP bit data is L.

7. The ATIP bit data generator according to claim 5, wherein the second level of the ATIP bit data is H.

8. The ATIP bit data generator according to claim 5, wherein the upper threshold value equals:

$A2*(1+2.38\%)$, wherein A2 denotes the second average cycle counting value.

9. The ATIP bit data generator according to claim 5, wherein the lower threshold value equals:

$A2*(1-2.17\%)$, wherein A2 denotes the second average cycle counting value.

10. The ATIP bit data generator according to claim 1, wherein the ATIP bit data is generated when the sync indication signal is enabled.

11. A method for generating an ATIP bit data, comprising the steps of:

generating an ATIP FM signal by receiving a signal generated from an optical pickup and further processing the signal;

generating a high-frequency clock using the ATIP FM signal as a reference signal;

generating a sync indication signal according to the ATIP FM signal and the high-frequency clock;

counting a pulse number of the high-frequency clock for each counting cycle, the counting cycle including a plurality of half periods of the ATIP FM signal;

generating an average cycle counting value for each counting cycle; and generating an ATIP bit data, the ATIP bit data being at a first level when the pulse number is smaller than a lower threshold value or greater than a upper threshold value and the ATIP bit data being at a second level when the pulse number is between the first threshold value and the second threshold value.

12. The method according to claim 11, wherein the counting cycle is 13, 14 or 15 periods of the ATIP FM signal.

13. The method according to claim 12, wherein the first level of the ATIP bit data is L.

14. The method according to claim 12, wherein the second level of the ATIP bit data is H.

15. The method according to claim 12, wherein the upper threshold value equals:

$A2*(1+2.38\%)$, wherein A2 denotes the average cycle counting value.

16. The method according to claim 12, wherein the second threshold value equals:

$A2*(1-2.17\%)$, wherein A2 denotes the average cycle counting value.

* * * * *